May 5, 1959   R. D. ATCHLEY   2,884,906
SERVO-MECHANISM
Filed May 23, 1956   6 Sheets-Sheet 2

INVENTOR.
RAYMOND D. ATCHLEY
BY
ATTORNEY.

May 5, 1959 R. D. ATCHLEY 2,884,906
SERVO-MECHANISM

Filed May 23, 1956 6 Sheets-Sheet 3

INVENTOR.
RAYMOND D. ATCHLEY
By Philip Subkow
ATTORNEY.

May 5, 1959  R. D. ATCHLEY  2,884,906
SERVO-MECHANISM
Filed May 23, 1956  6 Sheets-Sheet 4
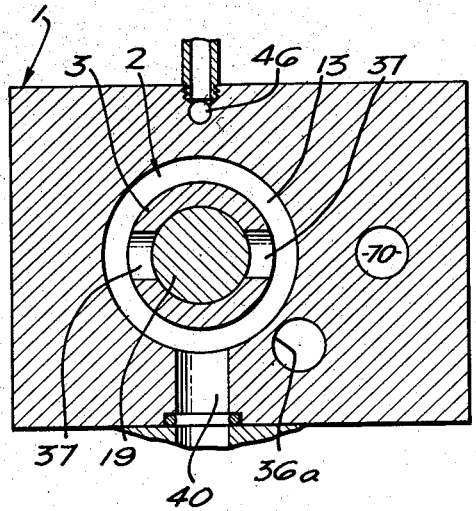
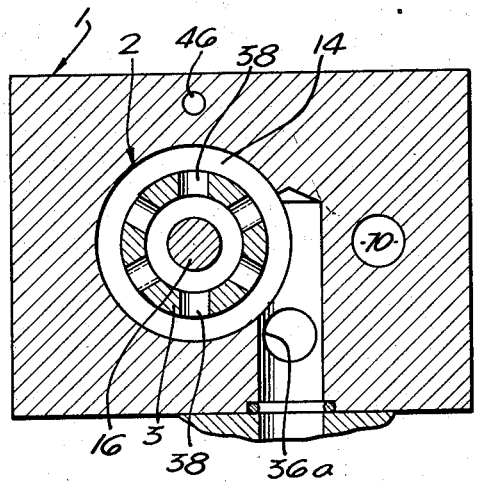
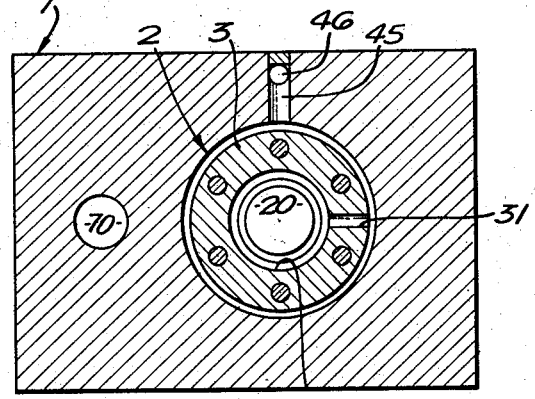
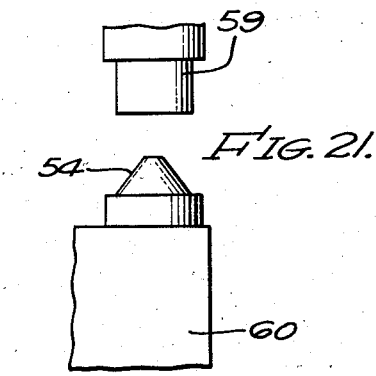
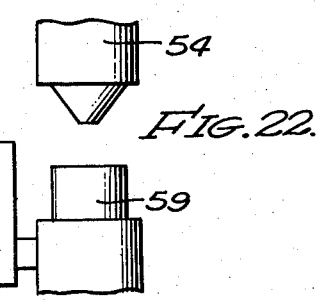
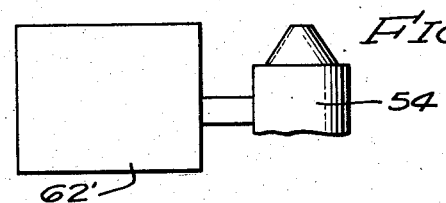
INVENTOR.
RAYMOND D. ATCHLEY
BY
ATTORNEY

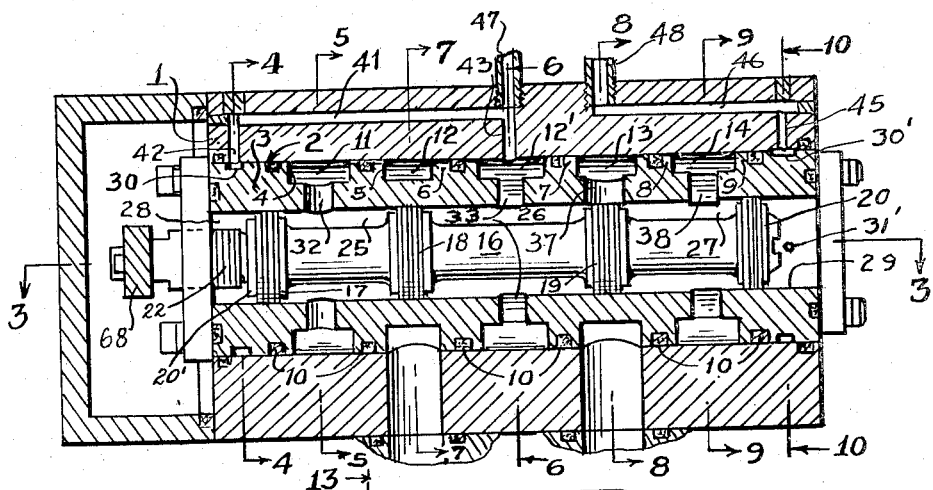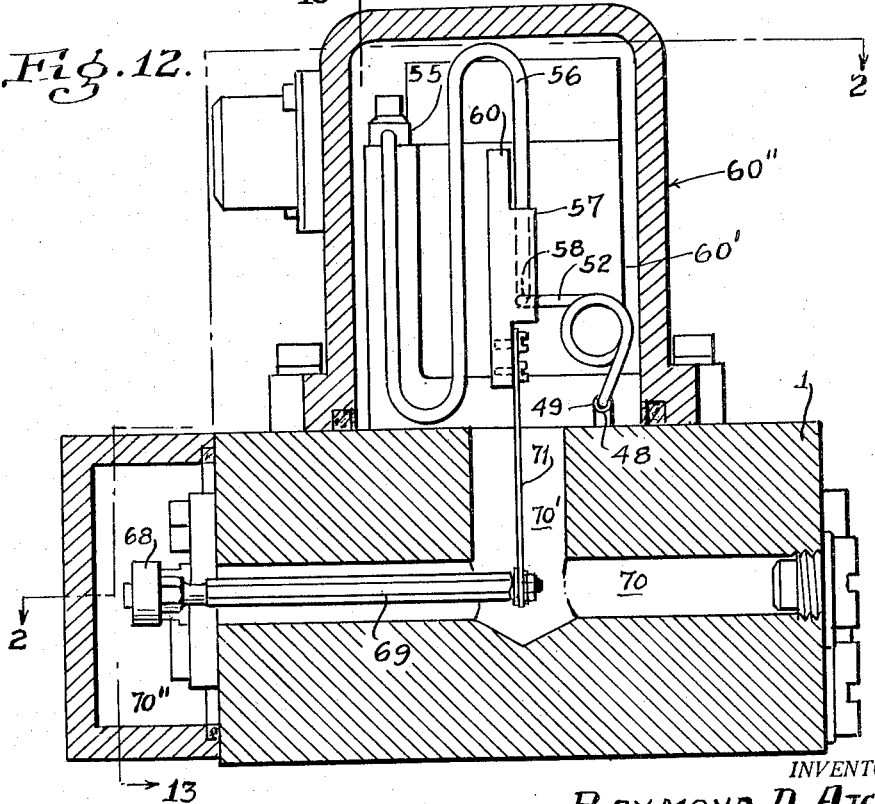

May 5, 1959  R. D. ATCHLEY  2,884,906
SERVO-MECHANISM
Filed May 23, 1956  6 Sheets-Sheet 6
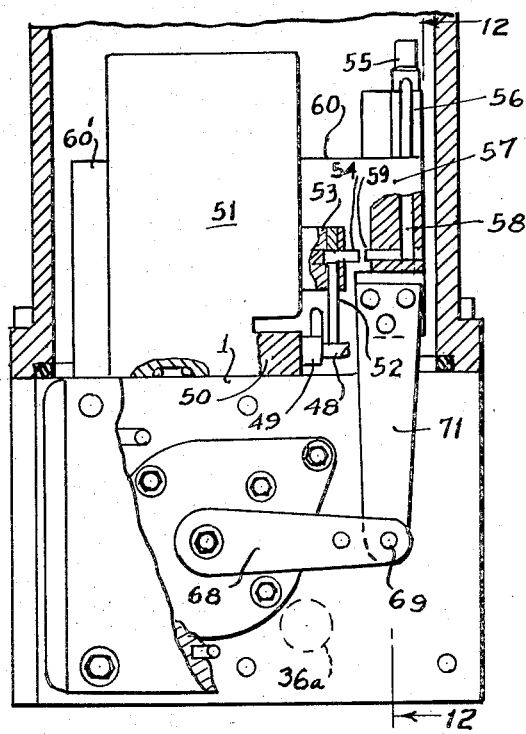
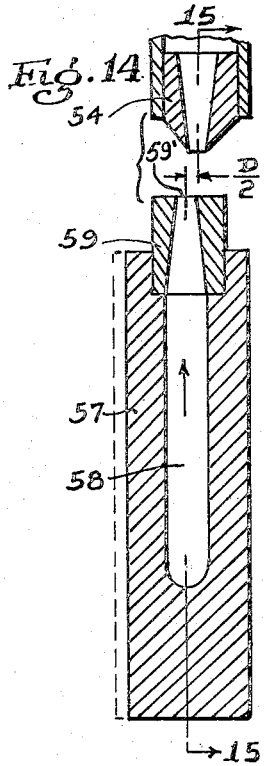
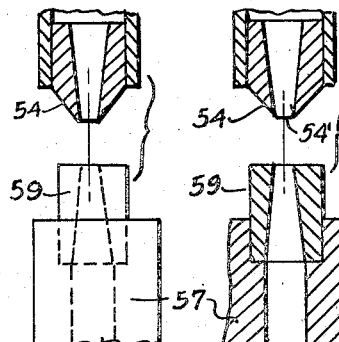
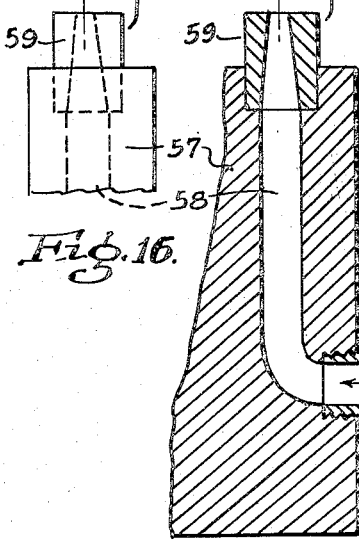
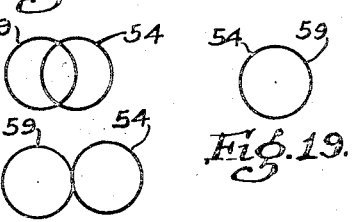
INVENTOR.
RAYMOND D. ATCHLEY
BY
ATTORNEY.

United States Patent Office 2,884,906
Patented May 5, 1959

2,884,906

SERVO-MECHANISM

Raymond D. Atchley, Los Angeles, Calif., assignor to Raymond Atchley, Inc., Los Angeles, Calif., a corporation of California Application May 23, 1956, Serial No. 586,778

20 Claims. (Cl. 121—41)

This invention relates to a hydraulic or pneumatic servo-mechanism in which the position of a slave valve is made responsive to a pilot valve which in turn is actuated responsive to a signal input which is related to the condition to be controlled by the slave valve.

In my particular preferred embodiment, the slave valve acts to control the supply to a motor means and does not become unbalanced with changes in supply pressure.

I employ as a pilot valve, a jet valve formed of two relatively movable jets, one of said jets acting as a projector jet, connected to line pressure and the other as a receptor jet connected to the main valve. The relative movement of the jets permits of a variable overlap of the jets and thus a variable fraction of the line pressure is exerted in the receptor jet. The difference in pressure between the input pressure to the projector jet and the recovery pressure in the receptor jets forms a two arm hydraulic bridge.

The jets are moved respectively to each other in response to an input signal which is responsive to the conditions to be controlled by the hydraulic servo-mechanism.

The two arm hydraulic bridge of the jet assembly acts as a hydraulic amplifier to magnify the power of the input signal sufficient to move the slave valve.

In my preferred design the jets may be made of low mass and with little or no friction or stiffness to oppose their motion so that they may be actuated by a transducer of low force output.

I have also introduced a simple mechanical feed back so that the ratio of the motion of the slave and pilot valve may be varied from 1 to 1 to any fraction that is desired either more or less than one.

These and other objects of my invention will appear from the following description taken together with the drawings of which:

Fig. 8 is a section taken on line 8—8 of Figs. 3 and 11;

Fig. 9 is a section taken on line 9—9 of Figs. 3 and 11;

Fig. 10 is a section taken on line 10—10 of Figs. 3 and 11;

Fig. 11 is a section taken on line 11—11 of Fig. 3;

Fig. 12 is a section taken on line 12—12 of Figs. 2 and 13 showing parts in elevation;

Fig. 13 is an irregular section taken on line 13—13 of Fig. 12;

Fig. 14 is a fragmentary section on line 14—14 of Fig. 13;

Fig. 15 is similar to Fig. 14 but in a plane 90° to that of Fig. 14, i.e., taken on line 15—15 of Fig. 14;

Fig. 16 is a view similar to Fig. 14 showing axial alignment of jets;

Fig. 17 is a view similar to Fig. 14 but with the jets axially displaced completely;

Fig. 18 is a schematic view showing the relationship of the nozzle areas in Fig. 14;

Fig. 19 is a similar view showing the relationship of the nozzle areas when the nozzles are superimposed so that they are axially co-incident; and Fig. 20 is a view similar to Fig. 18 showing the portion of the nozzles assumed in Fig. 17.

Figs. 21-23 show a variation in the mounting of the jets schematically illustrated.

Figure 3:
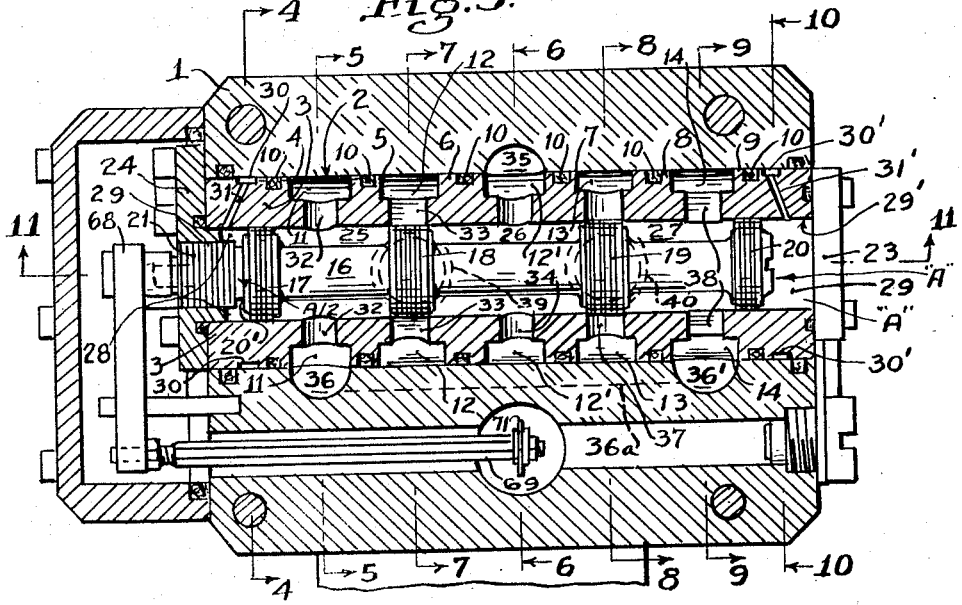
Fig. 3 is a section taken on line 3—3 of Fig. 11 line 2—2 of Fig. 13, with parts in plan.
Figure 4:
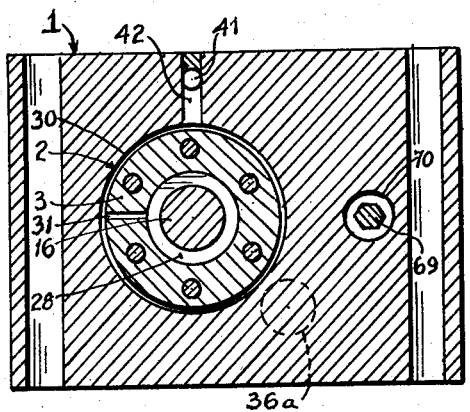
Fig. 4 is a section taken on line 4—4 of Figs. 3 and 11.
Figure 5:
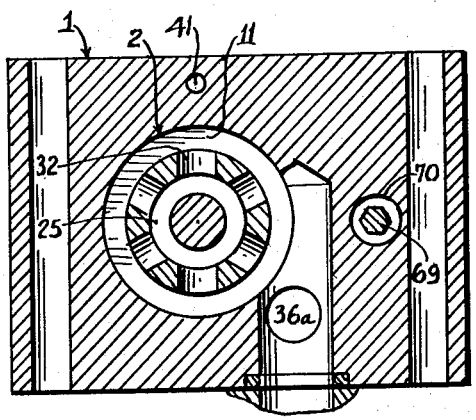
Fig. 5 is a section taken on line 5—5 of Figs. 3 and 11.
Figure 6:
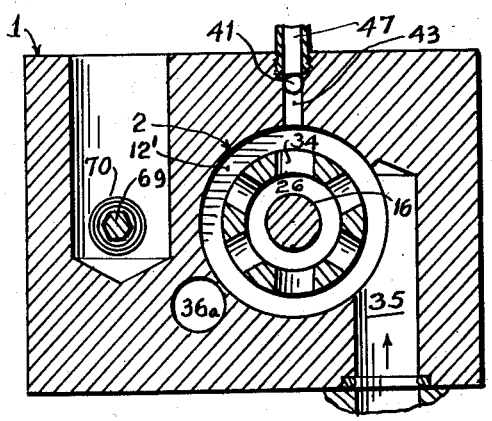
Fig. 6 is a section taken on line 6—6 of Figs. 3 and 11.
Figure 7:
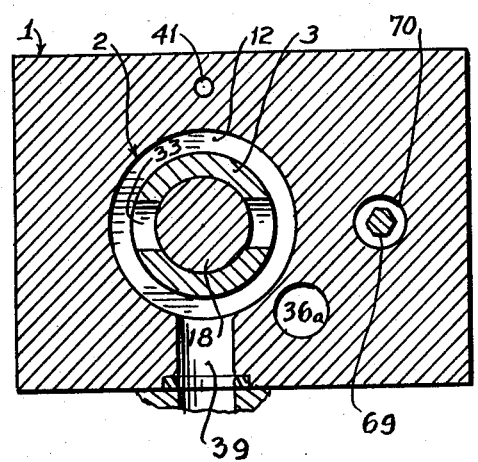
Fig. 7 is a section taken on line 7—7 of Figs. 3 and 11.

The main valve body 1 (see Figs. 1, 3 and 11) is axially bored at 2 and fitted with a stationary sleeve 3 having lands 4, 5, 6, 7, 8 and 9 and sealed in bore 2 by means of O rings 10 to give a plurality of annular chambers 11, 12, 12', 13 and 14 positioned intermediate the lands. The sleeve has an axial bore 29 into which is slidably fitted a spool 16 having carrying lands 17, 18, 19 and 20 and fitted to make a sliding and hydraulically tight contact with the wall of the bore 29'. The bore 29' is sealed by two end plates 23 and 24 suitably provided with O ring seals. The spool 16 protrudes through a bore in the plate 24 which makes an hydraulically tight sliding fit in the bore of plate 24.

The end of the spool 16 is positioned in the chamber 29 between the spool end 20 and the plate 23 and the other end of the spool 20' is in the chamber 28. The exposed area (A) of the spool end 20 in chamber 29 is twice the exposed area (A/2) of the spool end 20' in chamber 28. Thus the spool is moved by the piston 20 and 20' under the differential pressure in the chambers 28 and 29. The spool lands define annular chamber 25 between lands 17 and 18, annular chamber 26 between lands 18 and 19, and annular chamber 27 between lands 19 and 20. Both ends of sleeve 3 are grooved with external circular grooves 30 and 30' and a bore 31 connects the groove 30 with chamber 28 and bore 31' connects the groove 30' with chamber 29.

The sleeve is provided with ports 32 connecting the annulus 11 with the annulus 25 and with ports 38 connecting the annulus 27 with the annulus 14. Ports 33 and 38 are square ports, i.e., ports whose opposed sides are parallel and whose edges are in line with ends of the cylindrical lands 18 and 19 respectively and connect the annuli 12 and 13 respectively with the cylinder bore 29.

Inlet port 35 (see Figs. 1, 3, 11 and 6) is bored in the valve body 1 to intersect the interior bore of the sleeve 3. Outlets 39 and 40 are bored into the valve body 1 and terminate at the central bore 2 of the valve body 1 (see Figs. 1, 3, 11, 7 and 8). Exhaust ports 36 and 36' are bored into the valve body (see Figs. 1, 3, 11, 5 and 9) to intersect bore 2 at annuli 11 and 14 respectively. They are connected by a cross bored manifold 36a (see Figs. 5, 6, 7, 8 and 9).

The valve body 1 (see Fig. 11) also has a bore 41 which communicates with cross bore 42. Bore 42 terminates at groove 30. The bore 41 also communicates with bore 43. Bore 43 terminates in annular chamber 12'. A bore 46 is also provided in body 1 connecting with bore 45 which terminates at groove 30'. Bore 41 is connected to pipe 47 and bore 46 is connected to pipe 48.

Figure 1:
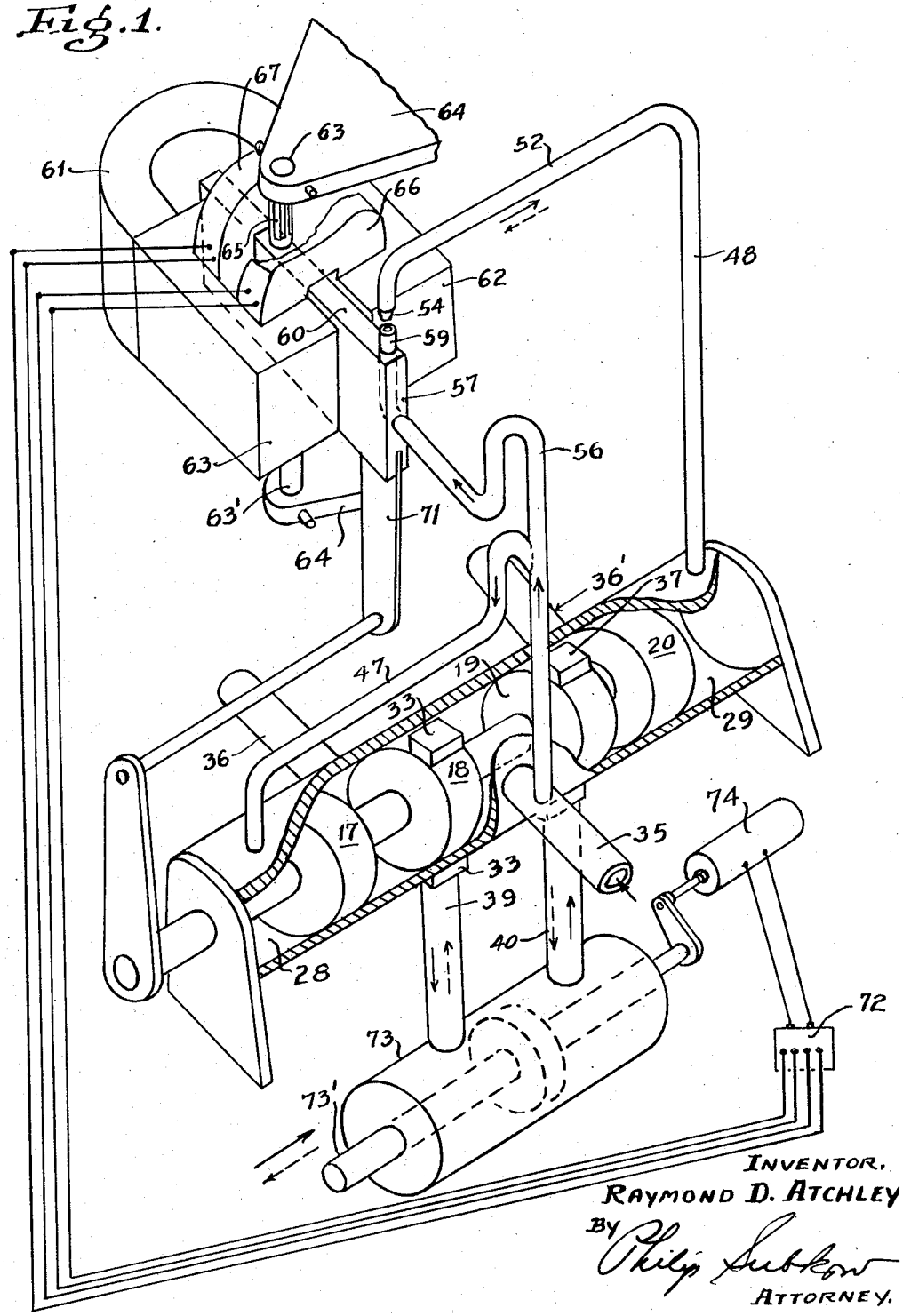
Fig. 1 is a schematic showing of the servo-valve of my invention employed in a hydraulic servo-system.

The pipes 47 and 48 are connected to the jet pilot valve by means of pipe connections not shown but illustrated schematically in Fig. 1. Pipe 48 connects with fitting 49 mounted on the frame 50 on which the torque motor 51 is also mounted. The fitting 49 is connected by means of flexible coil pipe 52 to a receptor jet 54, which is fixedly mounted by mounting 53 on the frame 50.

The pipe 47 is connected by pipe and bores not shown (but illustrated schematically in Fig. 13) to the fitting 55 and by a flexible pipe 56 to a block 57 which is bored with bore 58 and carries a projector jet 59, which has a flat or planar end 59' extending perpendicular to the center line of the jet as shown in Figs. 14 to 17. The block 57 is secured by screws to the armature 60 of the torque motor 51. As will be explained below, oil from the projector jet 59 may enter in part into the receptor jet 54 which has an end 54', conical in form as shown in Figs. 14 to 17 and in part spill into chamber 60' formed by the housing 60" which makes a fluid tight seal with the valve body 1 by means of an O ring. The accumulating oil is discharged via bore 70'—70, into the cavity 70" (Fig. 12) back through 36a into discharge port 36.

The transducer which is employed in my preferred embodiment to actuate the jet pilot valve may be of any design, is an electro-mechanical device which will generate a mechanical force which is preferably linearly responsive to a signal input and which may be balanced by a counterforce either of an electrical or mechanical nature. Such torque motors as are schematically illustrated in Fig. 1 as is conventional for such transducers have a polarizing magnet connected to pole pieces 62 and 63 to provide two spaced gaps in which the armature 60 is mounted for angular deflection in the gaps. Thus the armature may be mounted on a shaft 63' which is rigidly secured at its outer end to shaft supports 64 and at its inner end is rigidly secured to the armature 60. A torsional flexure such as a cruciform section 65 may be milled in the shaft on each side of the armature to provide rotation of the armature against a flexible constraint. Field coils 66 and 67 are positioned about the armature in inductive relation to the armature to provide the control flux. The coils are wound and excited by the signal input so that the flux generated by each of the coils buck each other and the net flux is proportional to any inequality in the current flow through the coils.

The oil flowing from either 39 or 40 enters into the hydraulic motor 73 shown schematically in Fig. 1 as a reciprocating hydraulic motor. The piston rod 73' may be connected as is conventional in the servo-mechanism art to any desired transducer depending on the nature of the variable to be controlled. The signal output, amplified if desired in amplifier 72 is transmitted to the coils to generate a net current equal to the difference of the currents passing through the bucking coils 66 and 67 and which difference is proportional to the variable whose control is desired.

The transducer 73, the electrical circuitry and the construction of the torque motor may be that conventionally used in this art.

The differential current may be made to be any function of the force or displacement of the hydraulic motor or related in any desired manner to the pressure or any other measurable variable of the system, at any selected place in the system. For purposes of illustration I have shown its application to a hydraulic motor in which the differential current is made proportional to the displacement. It could be made proportional to the velocity or acceleration of motion of the hydraulic motor by suitable well known transducers which are responsive to such variables. It could also be, for example, made responsive to the pressure or flow rate of the liquid in lines 39 and 40 by suitable pressure transducers inserted in line 39 and 40.

A feature of my invention is the closure of the servo-loop by a mechanical feed back, formed by connecting the transducer used for actuation of the pilot valve to the slave valve, illustrated in the preferred embodiment of my invention by the connection of the armature of the torque motor to the spool 16 of the slave valve. The end 22 of the spool is connected by a lever 68 to a rod 69 positioned in a bore 70 in the valve body 1. A cross bore 70 is also provided. The flat spring 71 is positioned in bore 70' and is connected to the rod 69 and the block 57.

The object of the servo-valve described above is to control oil flow into and out of lines 39 and 40 in proportion (in direction and magnitude) to the differential current in the torque motor. Assume that oil is introduced at port 35 at high constant pressure (P) and that the pressure is constant and is supplied independent of flow from a suitable source. With zero net current in the field coils 66 and 67, the armature 60 is centered in the null position and spool 16 is centered with lands 18 and 19 just covering the square ports 33 and 37. No flow occurs in or out of lines 39 and 40; the projector jet 59 covers one half of the area the receptor jet 54 (see Fig. 14). Both nozzles 54 and 59 of both circular and the receptor jet a diameter somewhat larger than that of the projector jet, for example, 1.41 times the diameter of the projector jet. With the spool centered the nozzles are axially displaced for a distance equal to half of the diameter of the nozzle (see Fig. 14). The recovery pressure in the receptor jet pipe 54 is P/2. Thus pressure P/2 is exerted through line 48, bores 46, 45, groove 30' (Fig. 11) and port 31' (Fig. 10) against the end 20, whose area is twice the free area of 20'. The full pressure P is transmitted from 35 (see Figs. 3, 6 and 11) through bores 43, 41, 42, groove 30, port 31, to chamber 28 (see Figs. 3, 4, 6 and 11). Thus the force exerted in chamber 29 against the spool end 20 is equal to the force exerted in chamber 28 against the spool. The spool is thus in a balanced position shown in Fig. 3.

Assume that hydraulic motor is displaced to the left by a force exerted against the piston rod 73' so that the transducer 74 is actuated to generate a signal which is amplified in 72 to introduce an unequal current through the coils 66 and 67 generating a net magnetic flux in the armature. Assume that this net flux is such as to move the armature and the projector jet 59 to the right, i.e., in a direction towards the axial alignment shown in Fig. 16.

More of the area of the receptor jet 54 is covered by the projector jet (see Fig. 14–17). This causes the pressure in the receptor jet pipe 52 and 48 to rise above P/2. The force exerted in chamber 29 on the spool 16 is greater toward the left, i.e., rises above PA/2 and overcomes the constant force (PA/2) toward the right exerted in chamber 28 against the spool end 20', a force which is equal to PA/2. The spool 16 then moves to the left.

As will be understood by those skilled in the art, a similar result is obtained if the receptor jet 54 is connected to the armature and the projector jet is made stationary, as shown in Fig. 21 provided the receptor jet is connected to the main valve via line 48 and the projector jet is connected to the input lines via line 56.

To prevent the main valve 16 from continuing to the left and to make its displacement proportional to the force produced by the differential current in the torque motor, i.e., to the magnitude of the signal from the transducer 74, the feedback lever 68, the feedback rod 69, and the feedback spring 71 are used to form a force feedback mechanical servoloop which limits the piston displacement to be directly proportional to force generated by torque motor armature. As the main valve 16 moves to the left, the feedback lever 68 is moved to the left and pulls on the feedback rod 69, which, in turn, deflects the feedback spring 71 and causes a force to act on the armature of the torque motor in opposition to the force produced by the differential current in the torque motor. When the force exerted via the spring 71 is sufficient to counterbalance the torsion in the cruciform section of the shaft induced by the control flux generated by the differential current in coils 65 and 66, the armature of the torque motor is moved back to null position to move the projector valve 59 back towards the null position. In this position the projector jet 59 again covers one-half the receptor jet 54. The pressure in the receptor jet pipe 48 is P/2, and the forces on the spool 16 are again balanced. The spool however is now at a new position displaced from the original zero or initial balance position of the spool and the spool 16 has been displaced a distance proportional to the magnitude of the differential current.

By employing parallel-sided ports 33 and 37 to provide variable orifices, the uncovered port area at 33 and 37 is made directly proportional to spool 16 displacement; and therefore the flow of high pressure oil through 40 and 39 is also made directly proportional to differential current.

It will be observed that the force on the block 57 and therefore the projector jet is proportional to the displacement of the rod 69 and depends on the stiffness of the spring 71.

Oil introduced at port 35 at high pressure passes from a suitable source via 34 and 26, piston land edge 18 and through square ports 33 annulus 12 and then goes to the pipe 39. The oil in pipe 39 then enters one end of a hydraulic cylinder 73 and because of its high pressure moves the piston in the cylinder. This forces oil out of the opposite end of the cylinder into pipe 40 and into annulus 13. This oil passes into square port 37 and passes piston land edge 19, and into annulus 27, port 38 and goes out exhaust port 36' and via 36a for recirculation to exhaust port 36 back to the source.

In a similar manner if the signal input into the torque motor moves the nozzle to separate their axis so that less of the nozzle area of the projector jet covers the receptor jet, i.e., in a direction towards the position shown in Fig. 17, the pressure in 29 falls below P/2 thus causing the spool 16 to move to the right.

Oil introduced at port 35 passes piston land edge 19, enters anular chamber 26, passes through square port 37, goes to line 40, returns through line 39, annular chamber 12, enters through square port 33 and passes piston land edge 18 and into annulus 25 through port 32 and goes out exhaust port 36 back to the source. The servo-valve control jet valve action and the feedback operate in a manner similar to manner previously described as will be understood by those skilled in this art.

It will be understood by those skilled in this art that the above illustrates a preferred embodiment of the principles of my invention and that variations of said embodiment may be made while employing said principles. Among such variations are the following which are given in further explanation of my invention and not as a limitation.

The recovery pressure in the receptor jet may be made any desired fraction of pressure in the projector jet at its null position by proportioning the free areas of the piston ends 20 and 20' so that the total force exerted on both ends of the piston be equal for the balanced null position. In other words, the pressures in chamber 29 and 28 should bear an equal but inverse relation to that of the free areas of the piston ends. Furthermore by varying the geometry of the jets, the variation of the pressure in chamber 29 as a function of the input signal to the torque motor may be made to be that which may be desired, to obtain a positive or negative magnification of the variation of pressure in 29 as a function of the displacement of the projector jet.

Further as described above, it will appear that instead of the projector jet being mounted for motion as for example, on the armature of the torque motors, it may be the stationary jet and the receptor jet instead of being stationary as described above, may be mounted on the armature in the same way as the receptor jet described herein with suitable connection of the receptor and the projector jet respectively as in the above description.

Instead of moving the jet by means of a torque motor, the jet may be moved manually as where the motion of the hydraulic motor is to be made proportional to a manual control. It may also be moved pneumatically or hydraulically or mechanically as where the motion of the hydraulic motor is to follow the signal which is given by any of the above means. Such means are generically and schematically shown as 60' on Fig. 22. The torque motor may be replaced by any other electro-mechanical transducer such as a relay. In each case the movable jet is moved by a transducer or other motor means which is either electrically, mechanically, hydraulically, pneumatically or manually actuated which will move the movable jet responsive to an input signal preferably linearly with respect to a variable of the condition to be controlled by the servo-mechanism and which may be controlled by a feed back operative superimposed as a balancing force upon the transducer or motor in a direction to oppose its motion and preferably to move it back to null position.

Because of its simplicity and unique values previously referred to, I prefer to employ a torque motor for this purpose as described above and employ the mechanical feed back described above.

Figure 2:
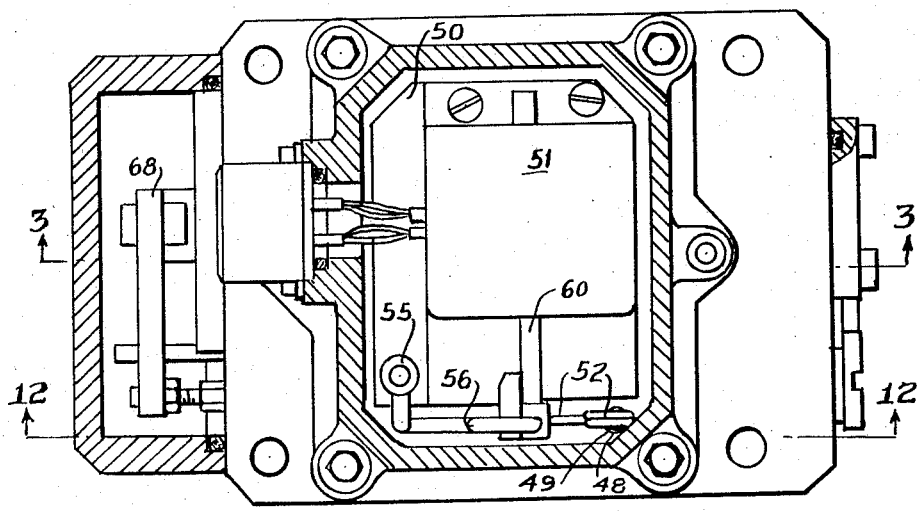
Fig. 2 is an irregular horizontal section taken on line 2—2 of Fig. 12 showing parts in elevation of my servo-valve according to my invention.

Another variation not illustrated but which will be clear to those skilled in the art from this specification is to mount one of the jets on one torque motor or other signal responsible transducer 61' and the other jet on another such transducer 62', as is schematically shown in Fig. 2. The jets are aligned as described above and the torque motors or other transducers are connected so that they are deflected equally in opposite directions by the same signal thus in the torque motor the appropriate field coils being connected in series. This multiplies the deflection of the jets for a given signal input—both jets being movable relative to each other and in opposite directions.

While I have described a particular embodiment of my invention for the purpose of illustration, it should be understood that various modifications and adaptations thereof may be made within the spirit of the invention as set forth in the appended claims.

I claim:

1. A valve comprising a sleeve, a chamber at each end of said sleeve, and a spool movably positioned in said sleeve one end in each chamber, a fluid input port in said sleeve, a fluid output port positioned in said sleeve, and lands on said spool to open and close said ports on motion, a fluid input port to each of said chambers, a projector jet positioned externally of said sleeve, a fluid connection between said projector jet and one of said chambers, a receptor jet positioned adjacent and spaced from said projector jet and in direct fluid communication with said projector jet, a fluid connection between said receptor jet and the other of said chamber, means for moving said jets relatively to each other to vary the fraction of the pressure in the projector jet recovered in the receptor jet.

2. In claim 1, a feed back connection between said spool and said movable jet.

3. In claim 2 said feed back connection comprising a spring connected to said movable jet and said spool.

4. A valve comprising a sleeve, a chamber at each end of said sleeve, and a spool movably positioned in said sleeve one end in each chamber, a fluid input port in said sleeve, a fluid output port positioned in said sleeve, valve means on said spool to open and close said ports on motion of said spool, a fluid input port to each of said chambers, a projector jet positioned externally of said sleeve, a fluid connection between said projector jet and one of said chambers, a receptor jet positioned adjacent and spaced from said projector jet and in direct fluid communication with said projector jet, a fluid connection between said receptor jet and the other of said chamber, means for moving said spool in said sleeve, means for fixedly mounting one of said jets and means for moving the other of said jets relative to said fixedly mounted jet to vary the fraction of the pressure in the projector jet recovered in the receptor jet.

5. In claim 4, a feed back connection between said spool and said movable jet.

6. In claim 4, said feed back connection comprising a spring connected to said movable jet and said spool.

7. A valve comprising a spool valve comprising a sleeve, a chamber at each end of said sleeve, and a spool movably positioned in said sleeve one end in each chamber, a fluid input port in said sleeve, a fluid output port positioned in said sleeve, valve means on said spool to open and close said ports, a fluid input port to each of said chambers, a projector jet positioned externally of said sleeve, a fluid connection between said projector jet and one of said chambers, a receptor jet positioned adjacent and spaced from said projector jet and in direct fluid communication with said projector jet, a fluid connection between said receptor jet and the other of said chamber, means for fixedly mounting one of said jets and means for moving the other of said jets relative to said fixedly mounted jet to vary the fraction of the pressure in the projector jet recovered in the receptor jet, said means for moving said other jet including a transducer connected to said movable jet.

8. A valve comprising a spool valve comprising a sleeve, a chamber at each end of said sleeve, and a spool movably positioned in said sleeve one end in each chamber, a fluid input port in said sleeve, a fluid output port positioned in said sleeve, valve means on said spool to open and close said ports, a fluid input port to each of said chambers, a projector jet positioned externally of said sleeve, a fluid connection between said projector jet and one of said chambers, a receptor jet positioned adjacent and spaced from said projector jet and in direct fluid communication with said projector jet, a fluid connection between said receptor jet and the other of said chamber, a torque motor including an armature, one of said jets being mounted on the armature of said torque motor for motion with said armature.

9. A valve comprising a spool valve comprising a sleeve, a chamber at each end of said sleeve, and a spool movably positioned in said sleeve one end in each chamber, a fluid input port in said sleeve, a fluid output port positioned in said sleeve, a valve means on said spool to open and close said ports, a fluid input port to each of said chambers, a projector jet positioned externally of said sleeve, a fluid connection between said projector jet and one of said chambers, a receptor jet positioned adjacent and spaced from said projector jet, and in direct fluid communication with said projector jet, a fluid connection between said receptor jet and the other of said chamber, means for fixedly mounting one of said jets, a torque motor including an armature, the other of said jets connected to said armature for motion of said jet with said armature.

10. In claim 9, a feed back connection between said armature and said spool.

11. In claim 9, a spring connecting said armature and said spool.

12. A fluid actuated servo-valve comprising a valve body, a slidable spool in said valve body, a fluid inlet port and a fluid outlet port in said valve body, means on said spool to open and close said ports on motion of said spool, fluid actuated means to move said spool, said means including piston means and chambers at each end of said piston means, variable orifices in said valve body, the said spool on motion varying the opening of said variable orifices, means to exert fluid pressure in each of said chambers, said means including a pair of opposed jets in fluid communication with each other, a fluid conduit connected to said inlet port and to one of said jets, said one jet discharging into the other of said jets, one of said jets being movably mounted, means for moving said last named jet relative to the other of said jets responsive to a signal, said means establishing a pressure difference between said chambers responsive to said motion to displace said spool in said valve to vary the opening of said variable orifices, said other jet being fixedly positioned relative to said valve body.

13. In the servo-valve of claim 12, a mechanical feed back connection between said movable jet and said spool.

14. In the servo-valve of claim 12, said movably mounted jet being flat ended and said fixedly mounted jet being conically ended.

15. A fluid actuated servo-valve comprising a valve body, a slidable valve member in said valve body, a fluid inlet and a fluid outlet port in said valve body, means on said valve member to open and close said ports on motion of said valve member, fluid actuated means to move said valve member, said fluid actuated means comprising a piston means, a pair of chambers one on each end of said piston means, said means including variable orifices in said valve body, the said valve member on motion varying the opening of said variable orifices, means to exert fluid pressure in each of said chambers, said means including a pair of opposed jets in fluid communication with each other, one of said jets being fixedly positioned and stationary, a fluid conduit connected to said fluid inlet port and one of said jets, said one jet discharging into the other of said jets, means for moving the other of said jets relative to the first mentioned jet responsive to a signal, said moving means establishing a pressure difference between said chambers which is proportional to said motion.

16. In the device of claim 15, a mechanical feed back connection between said valve member and said means for moving said jet.

17. In the device of claim 15, said jet connected to said fluid conduit being flat ended and discharging into the other of said jets, said other jet being conically ended.

18. In the device of claim 17, a mechanical feed back connection between said valve member and said means for moving said jet.

19. In the device of claim 15, a fluid inlet connection to said inlet port and to one of said jets and to one of said chambers and the other of said jets connected to the other of said chambers.

20. In the device of claim 15, a flexible feed back connection between the valve member and said means for moving said jet.

References Cited in the file of this patent

UNITED STATES PATENTS

| | | |
|---|---|---|
| 1,776,817 | Mugler | Sept. 30, 1930 |
| 2,047,922 | Seligmann | July 14, 1936 |
| 2,234,326 | Tiebel | Mar. 11, 1941 |
| 2,247,301 | Leser | June 24, 1941 |
| 2,312,464 | Ziebolz | Mar. 2, 1943 |
| 2,333,044 | Rosch | Oct. 26, 1943 |
| 2,376,359 | Hultin | May 22, 1945 |
| 2,397,448 | Todd | Mar. 26, 1946 |
| 2,503,447 | May | Apr. 11, 1950 |
| 2,615,658 | Young | Oct. 28, 1952 |

FOREIGN PATENTS

| | | |
|---|---|---|
| 372,258 | Great Britain | May 5, 1932 |